INVENTORS
JULES HERVE GEFFROY
PAUL FLEURY
by
ATTORNEY

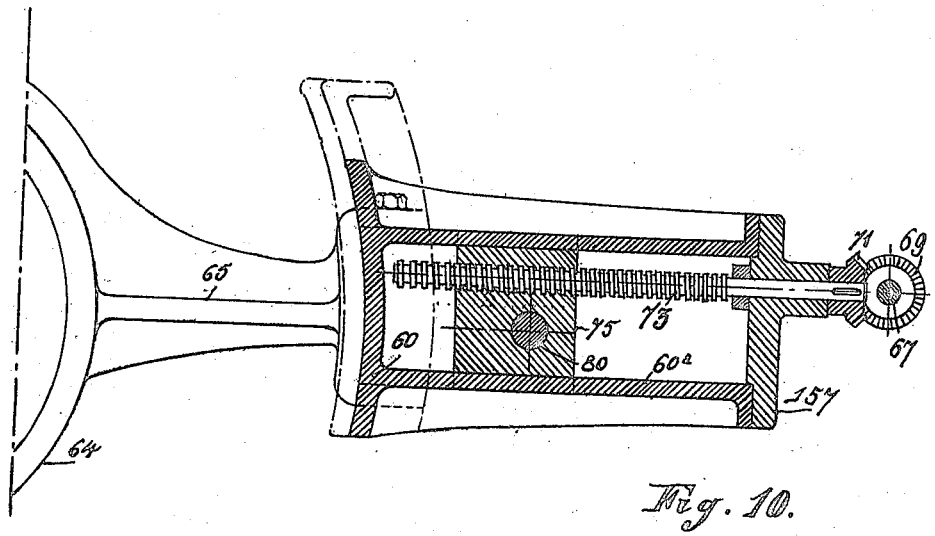
Fig. 9.
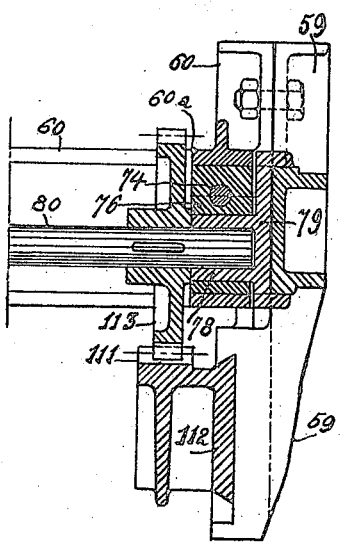
Fig. 10.
Fig. 1.
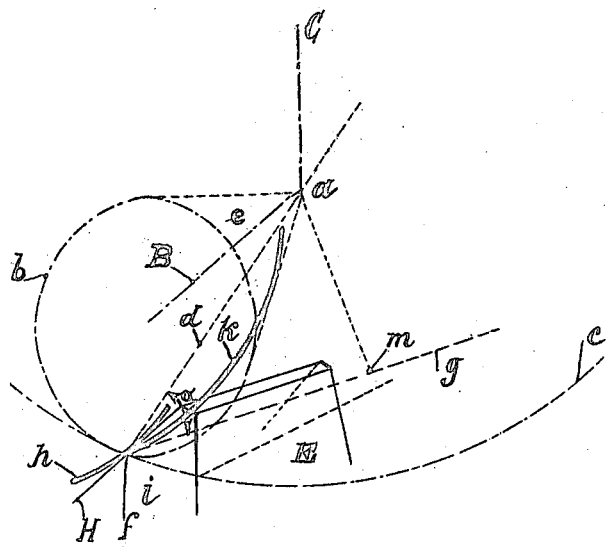

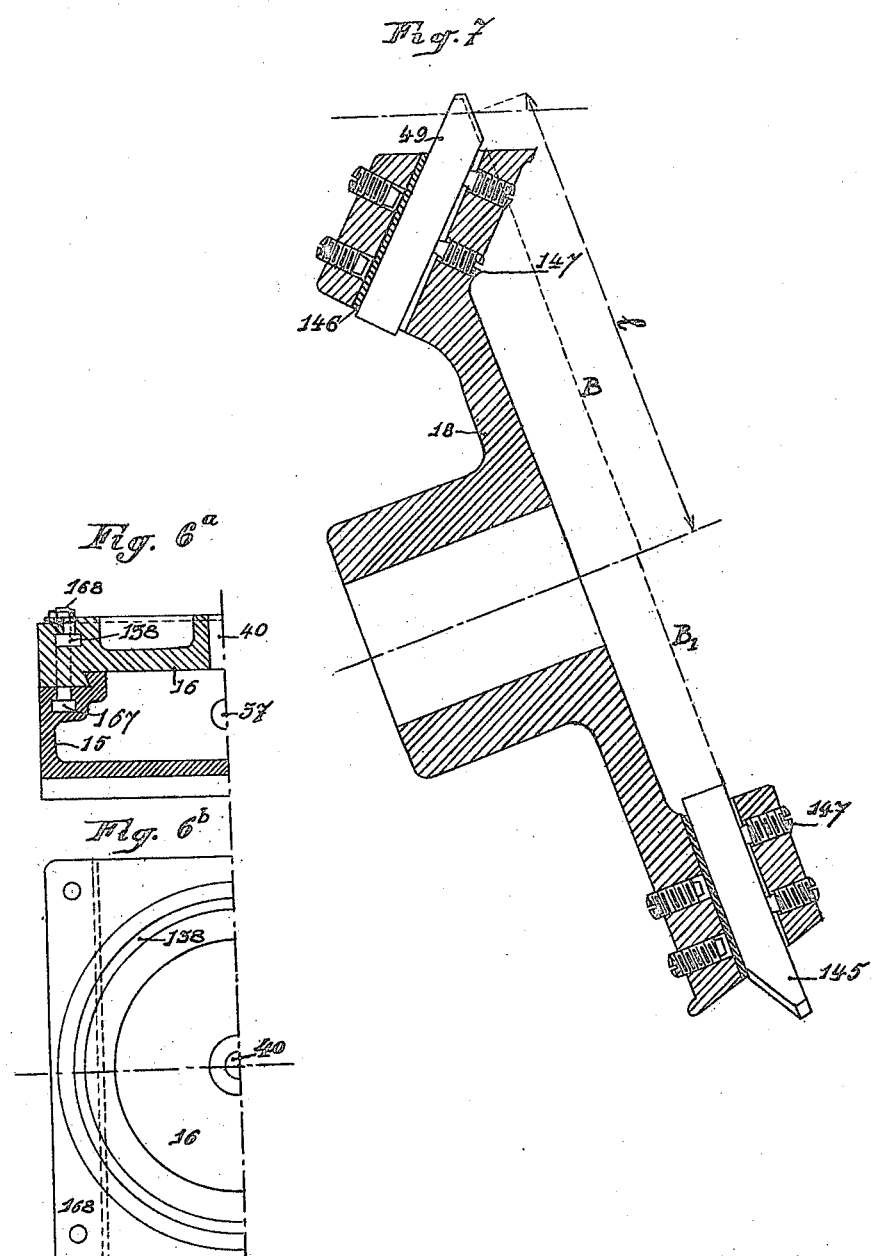

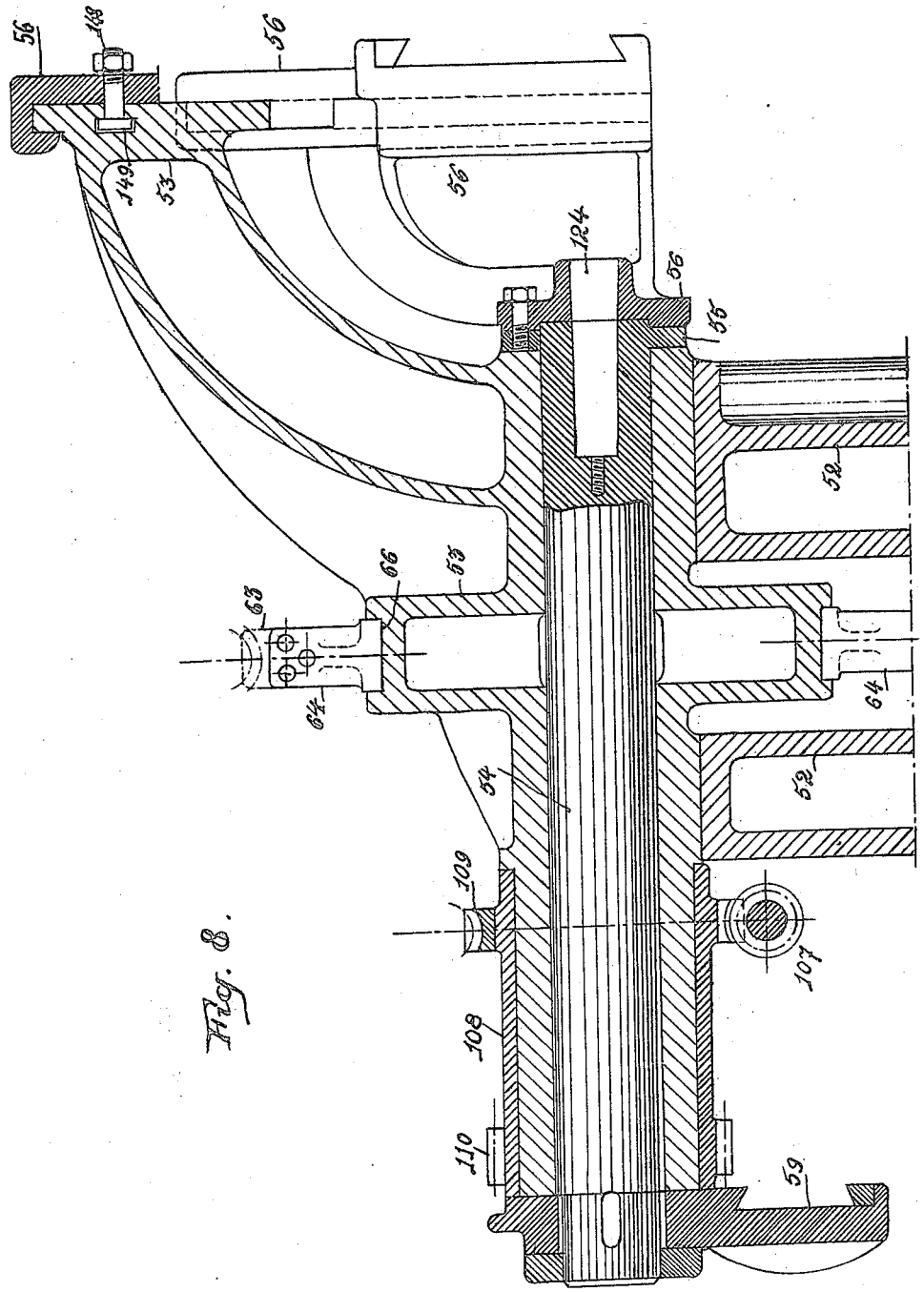

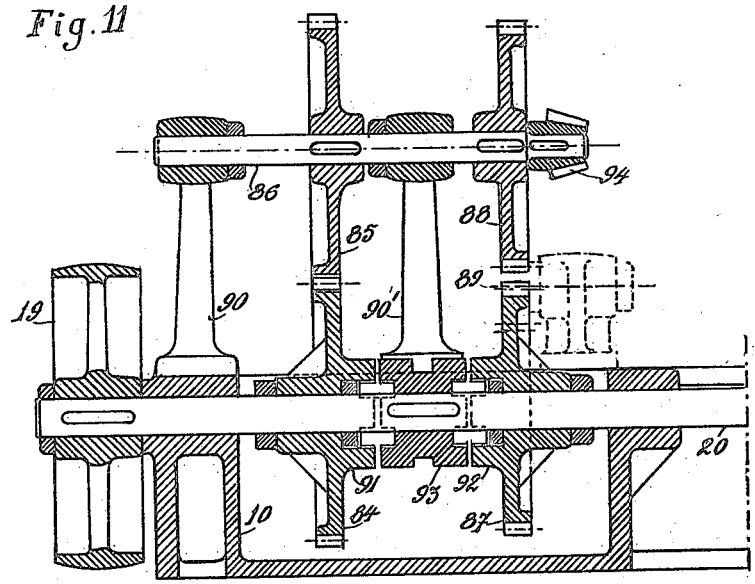
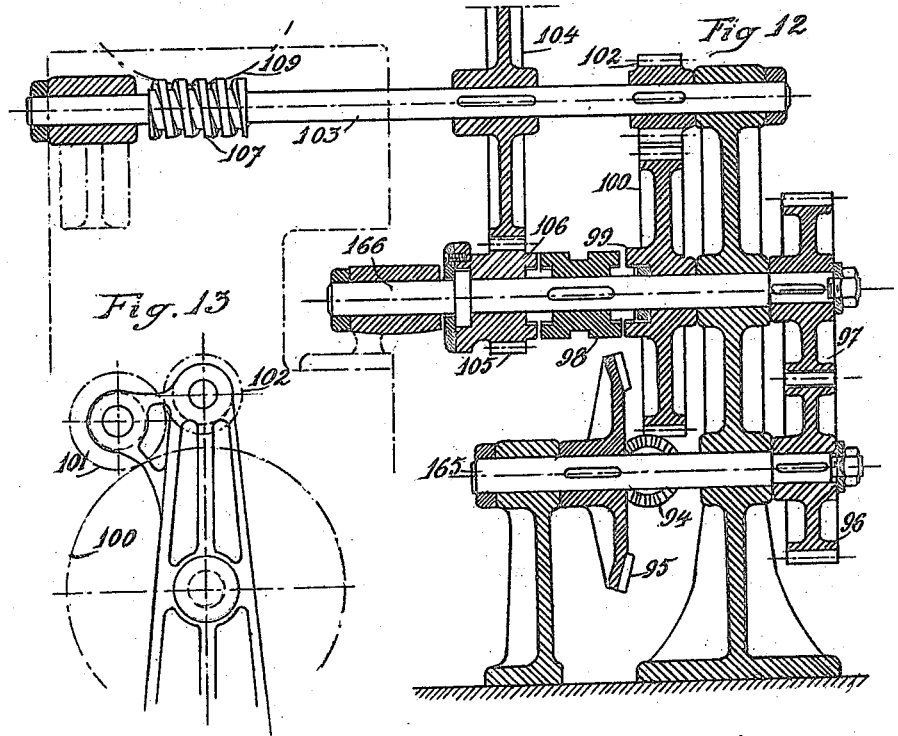

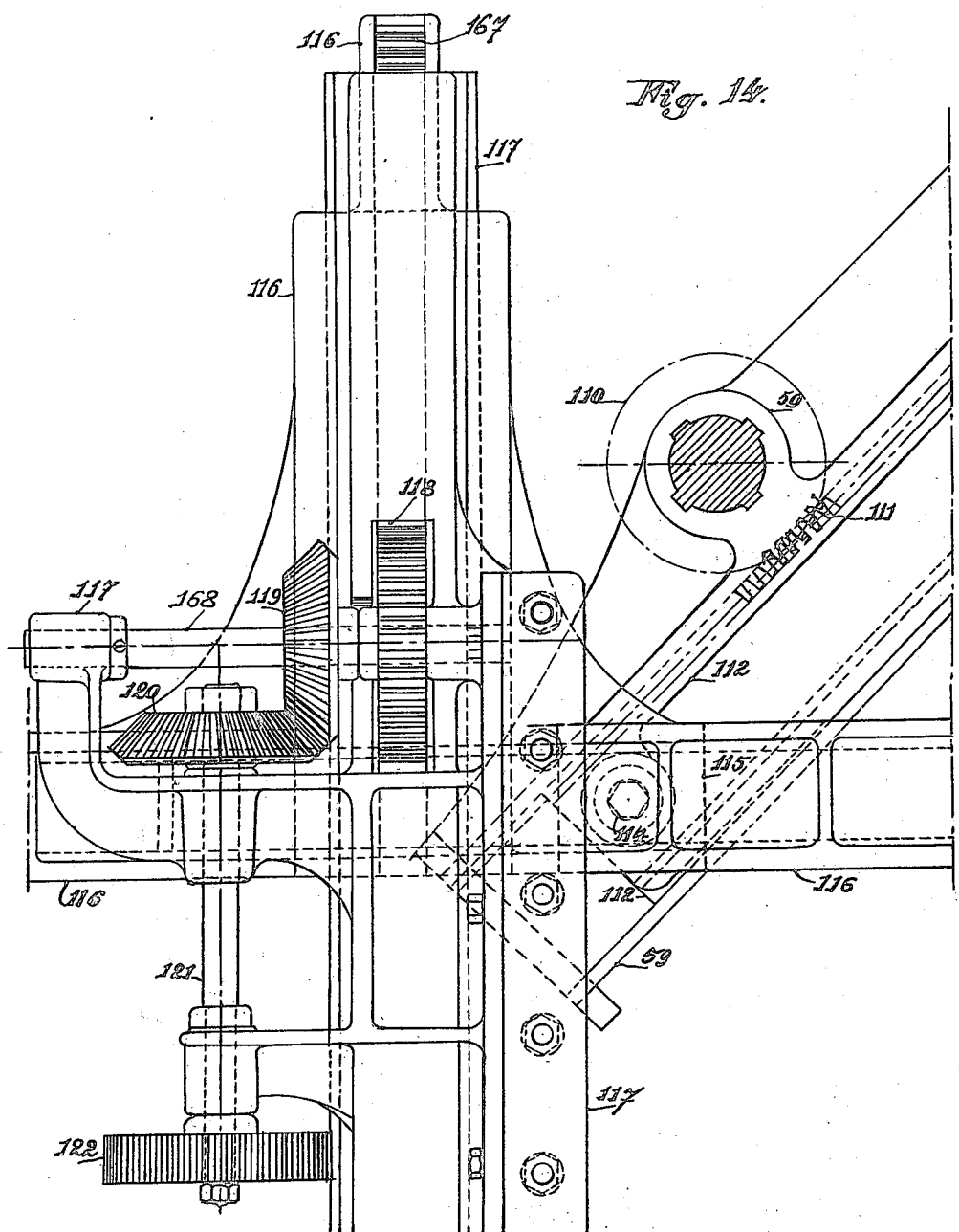

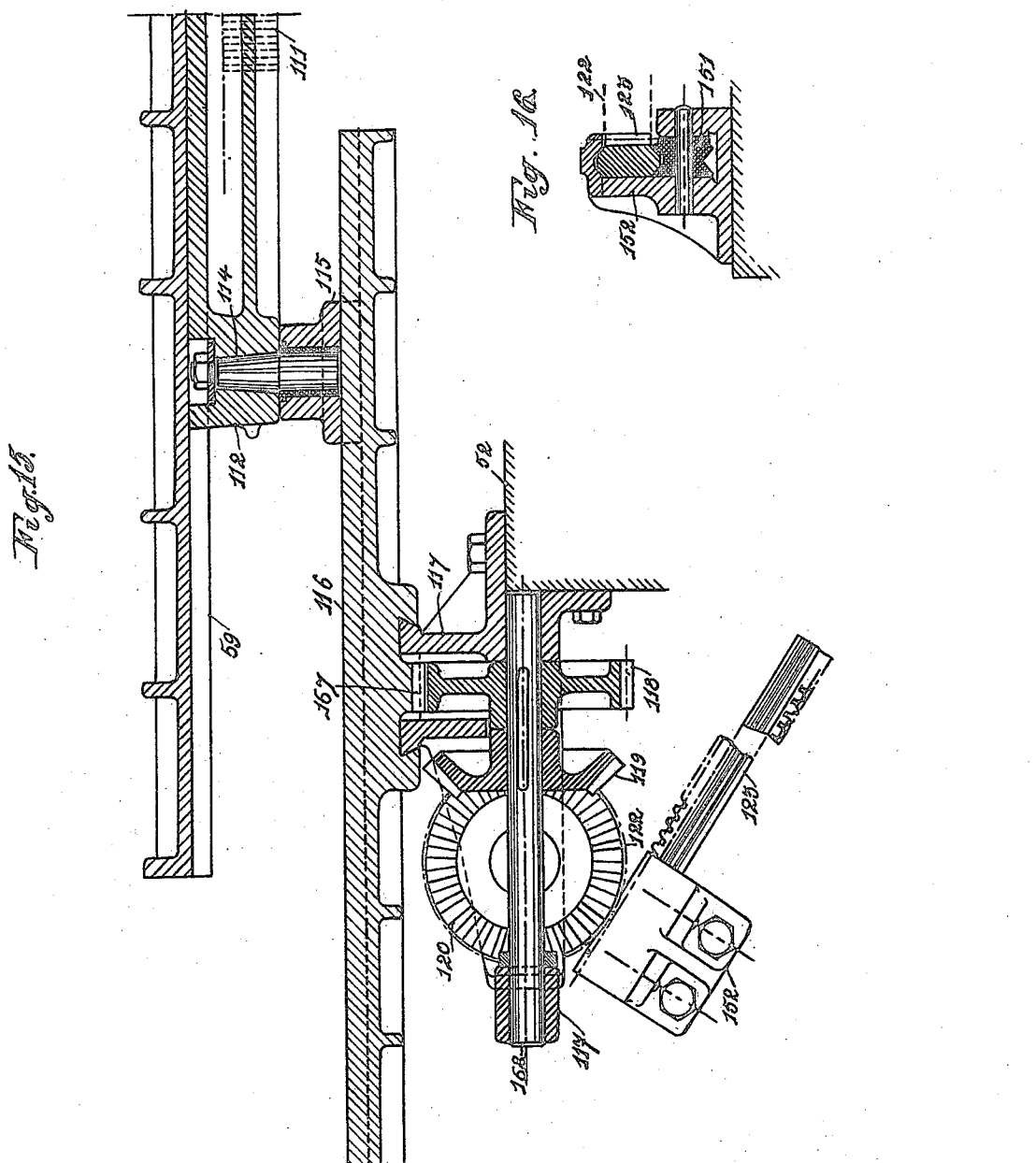

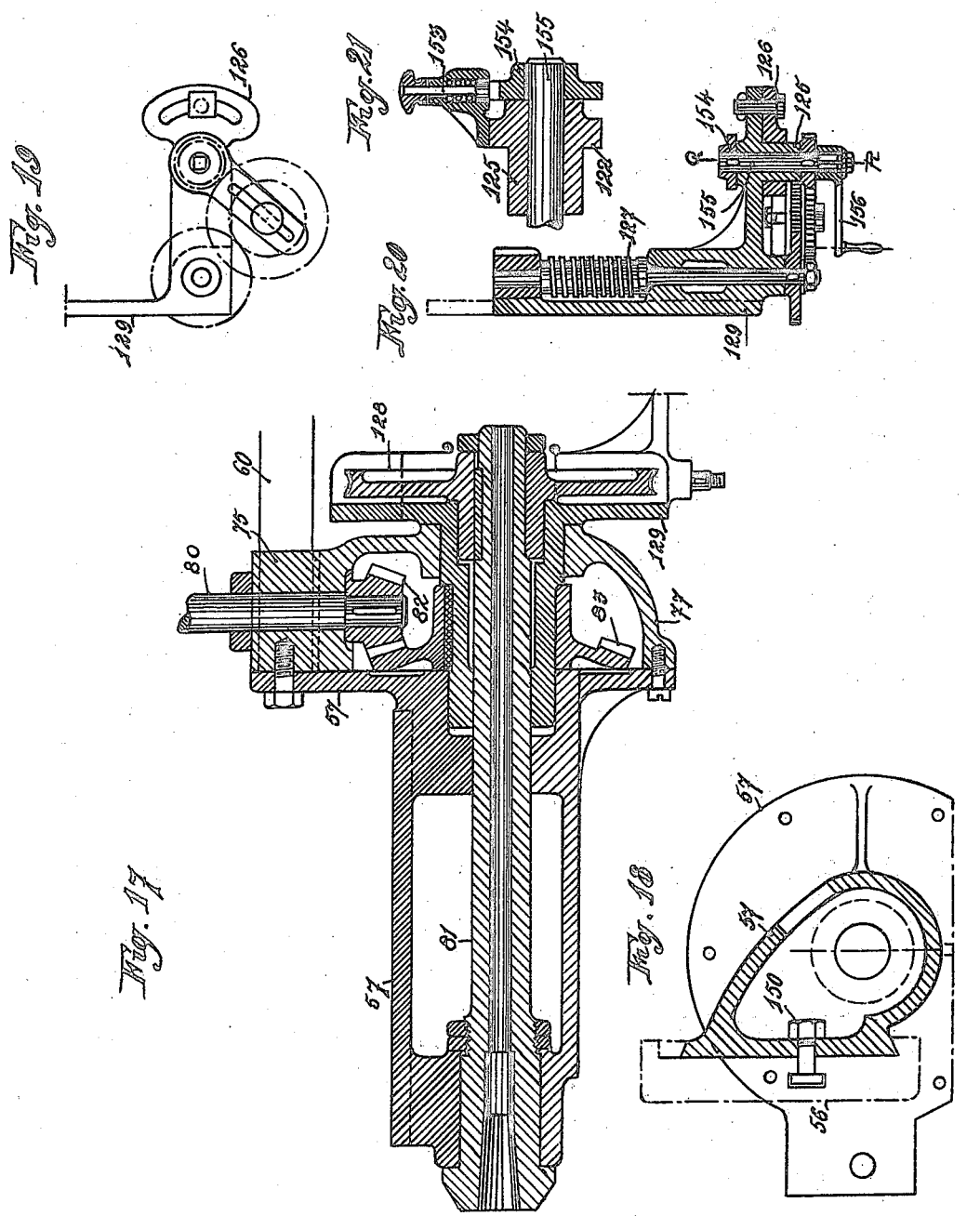

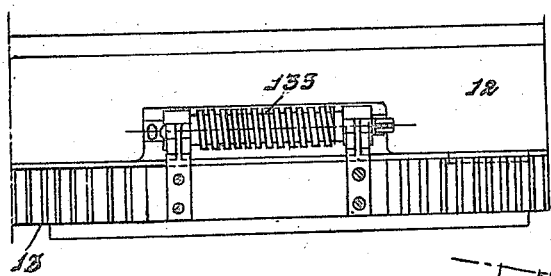
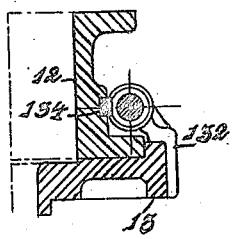
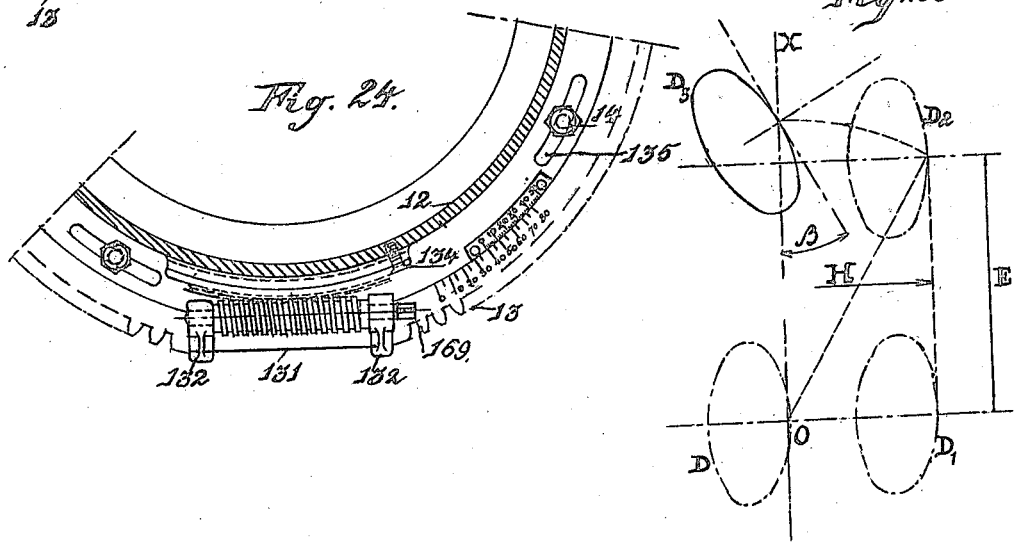
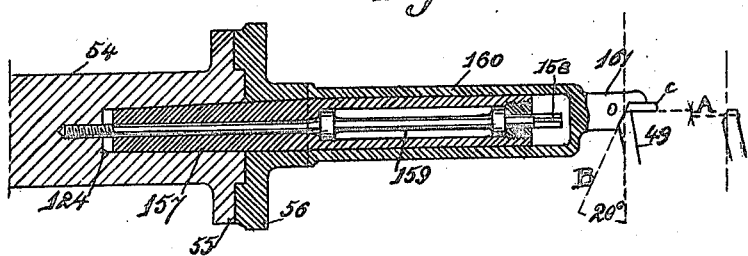

UNITED STATES PATENT OFFICE.

JULES HERVÉ GEFFROY AND PAUL FLEURY, OF PARIS, FRANCE.

MACHINE FOR CUTTING SPIRAL BEVEL GEARS.

1,403,143.   Specification of Letters Patent.   Patented Jan. 10, 1922.

Application filed February 25, 1919. Serial No. 279,156.

*To all whom it may concern:*

Be it known that we, JULES HERVÉ GEFFROY and PAUL FLEURY, residing at Paris, France, have invented new and useful Improvements in a Machine for Cutting Spiral Bevel Gears, of which the following is a specification.

The invention has for its object the provision of a machine for cutting conical helical gear teeth by means of a special cutter. To this effect the pinion to be cut receives a predetermined movement, and the cutter is given a continuous rotary movement and, in addition, is moved so that the teeth receive a helical form. The cutter has a plurality of cutting tools whereby their sharpening is facilitated and their adjustment rendered convenient. The cutting tools are of simple construction and may be conveniently replaced. The cutter has a large diameter whereby a large number of cutting tools may be employed. By reason of the continuous advance of the cutter during operation, a quick cutting is effected. The machine is based on the utilization of a principle whereby it is possible to cut spur teeth and helical teeth. The machine forms the teeth with curved bottoms. The radius which measures the concavity is very small, by reason of the large diameter of the cutter.

The machine is furthermore characterized in this, that the same parts can cut teeth of different coefficients without any preliminary work or costly adjustment. The adjustments in known machines are complicated and require considerable time which is not warranted for the manufacture of single gears. In the present machine, however, the adjustment may be effected in a simple and quick manner. The short duration within which adjustment may be effected makes this machine available for the production of a small number of gear wheels. In known machines, however, they can only be employed for work in large series.

An embodiment of the invention is indicated in the annexed drawings:

Fig. 1 is a diagrammatic view explaining the principle on which the present machine is predicated;

Figure 2:
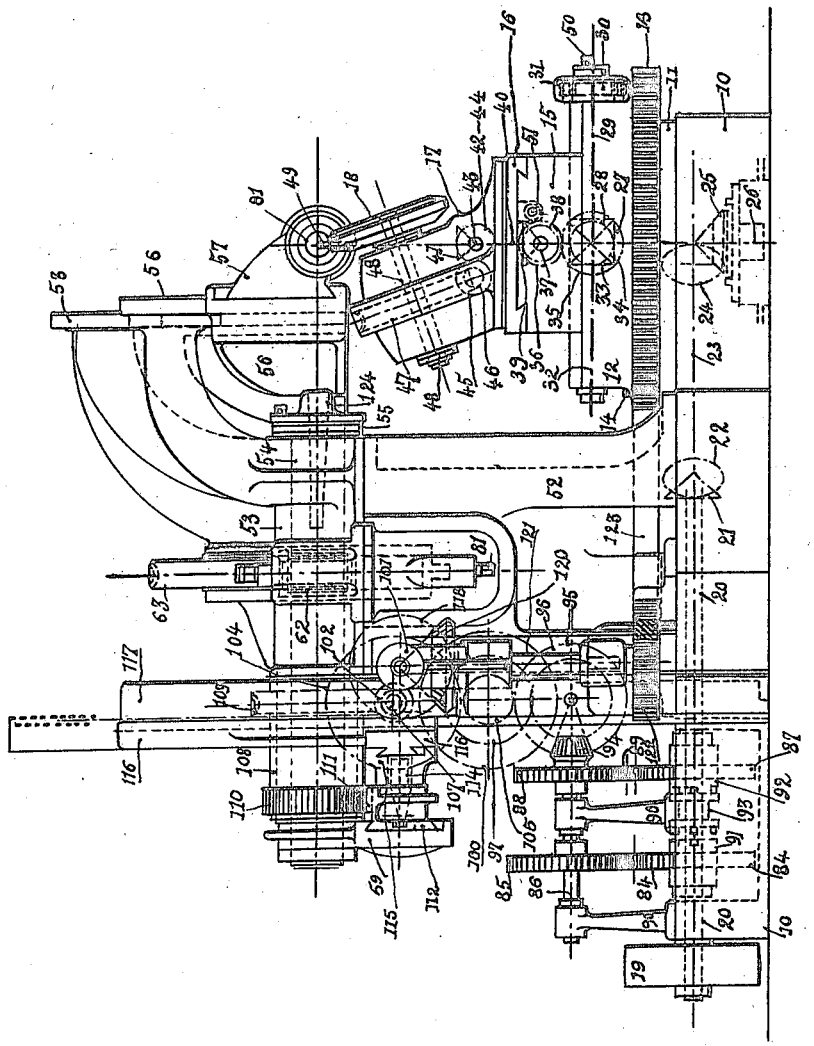
Fig. 2 is a side elevation of the machine.
Figure 3:
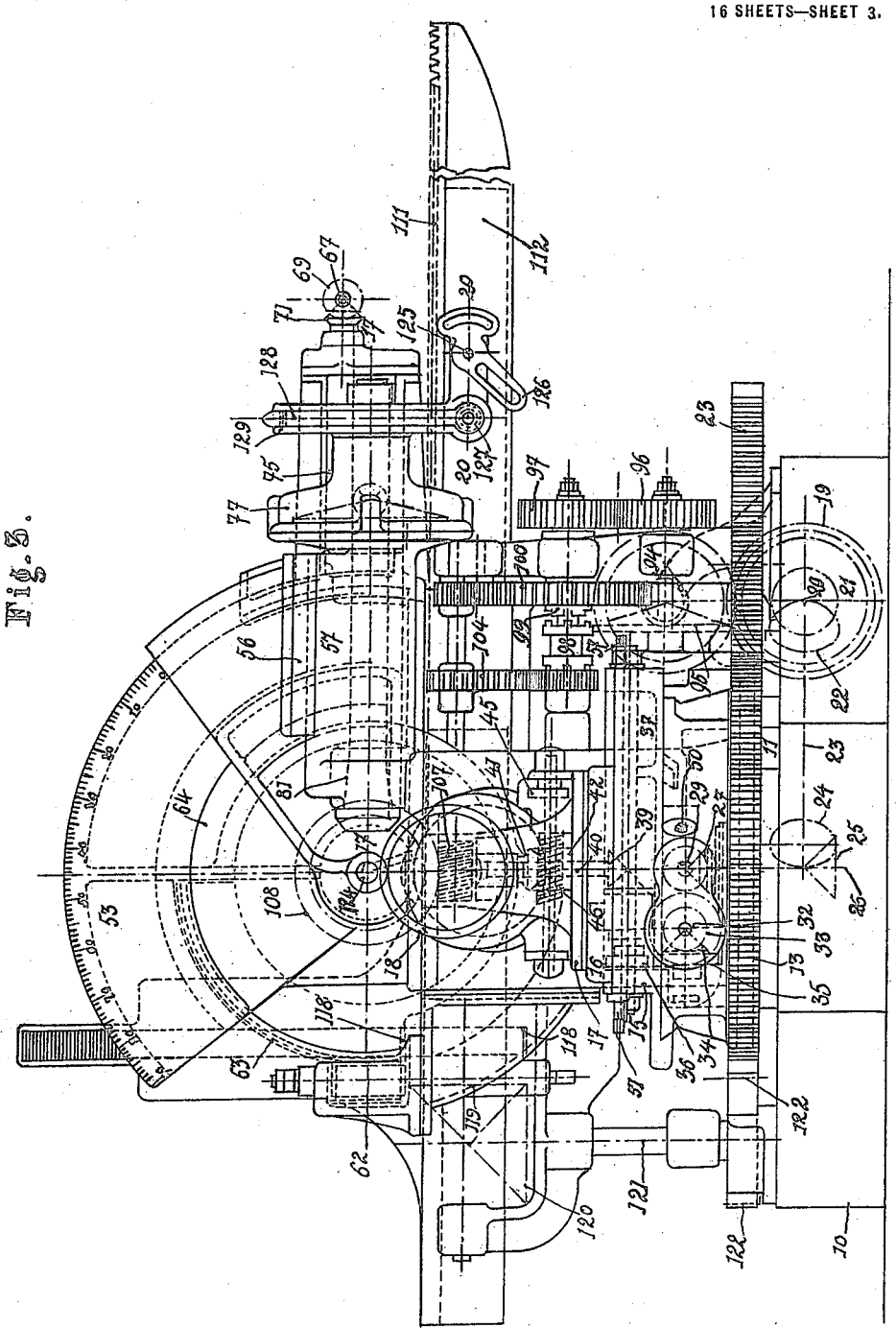
Fig. 3 is a front elevation of the machine.
Figure 4:
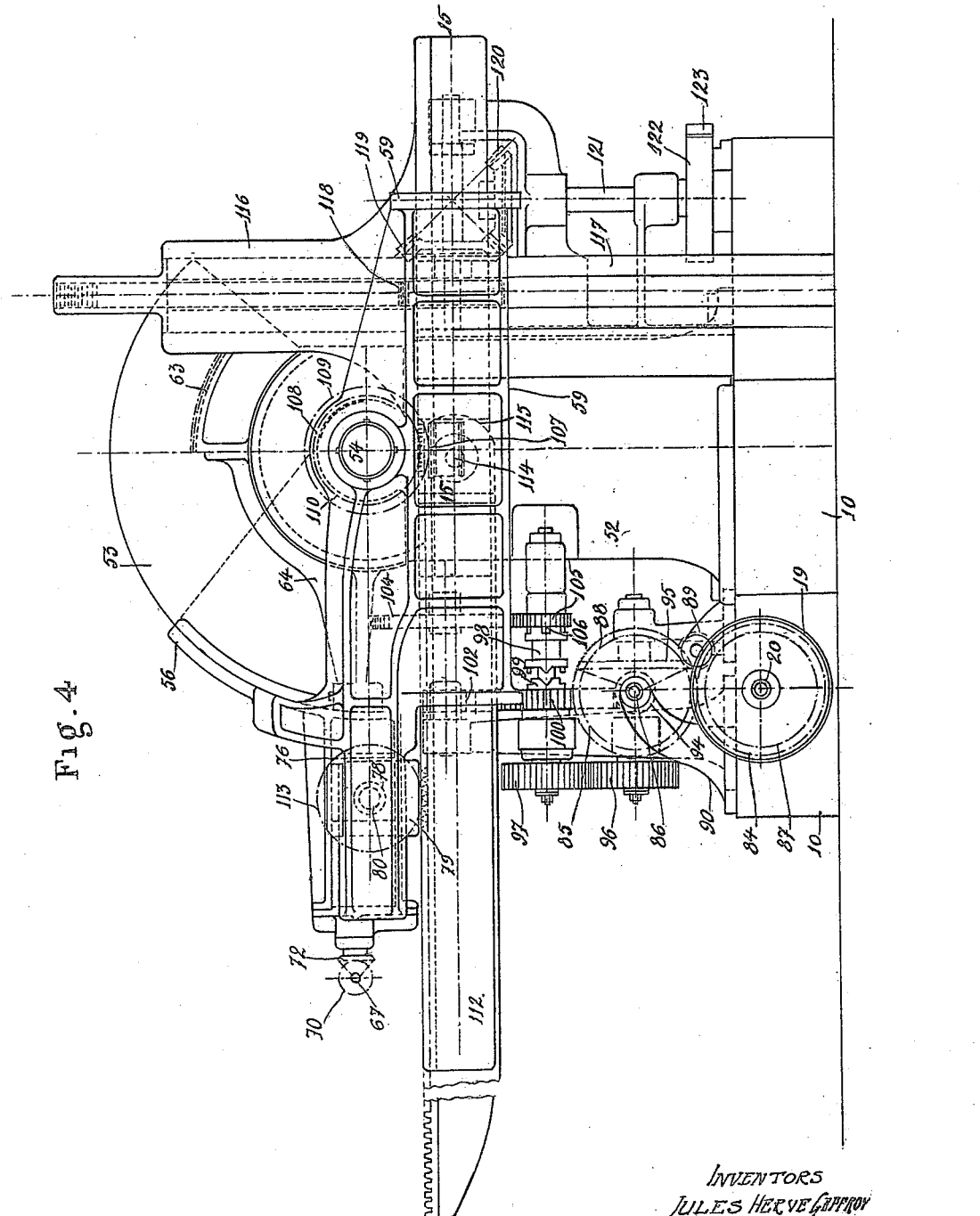
Fig. 4 is a rear elevation.
Figure 5:
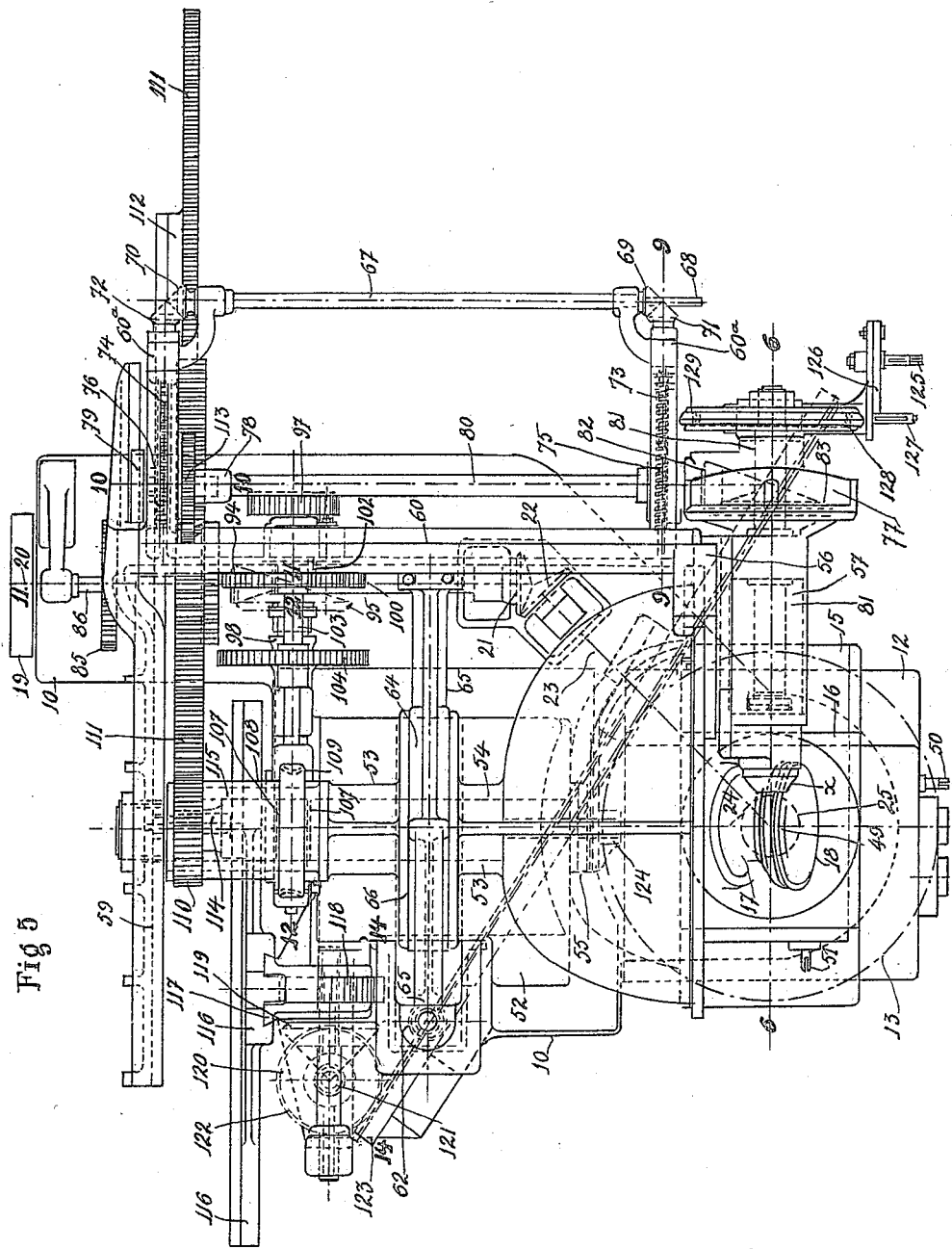
Fig. 5 is a top plan view of the machine.
Figure 6:
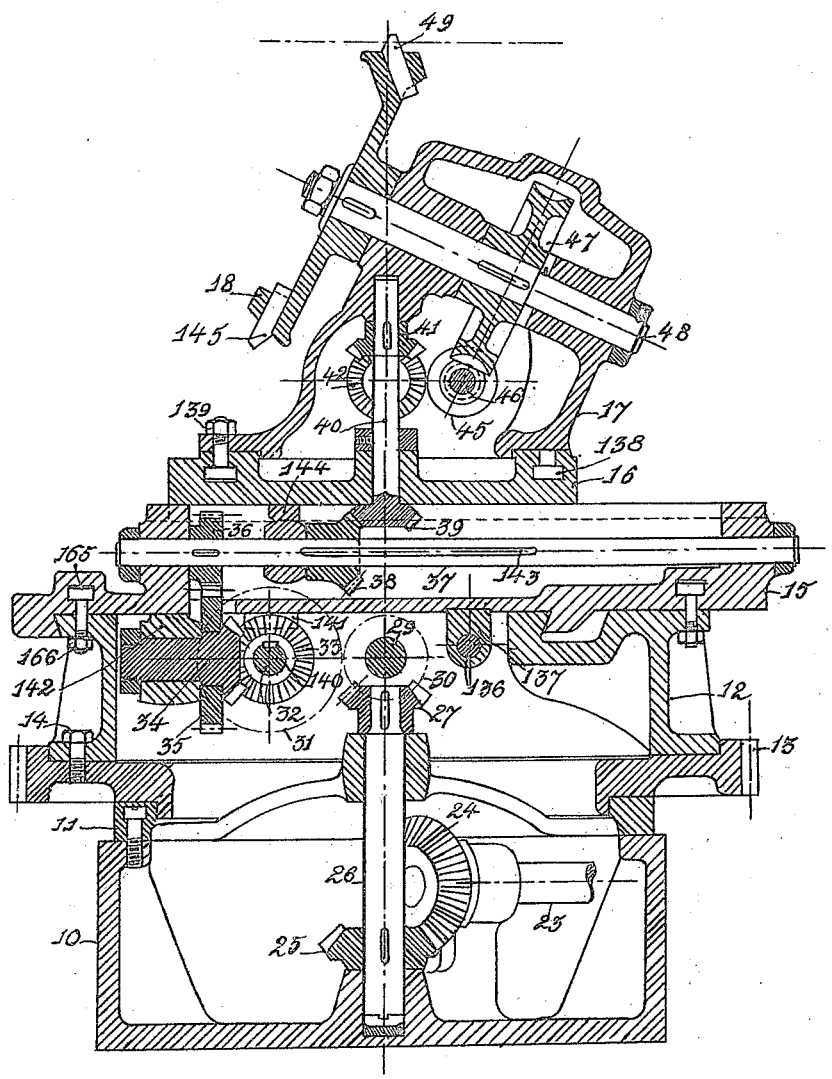
Fig. 6 is a section elevation of the turret on the line 6—6 of Fig. 5.
Figure 27:
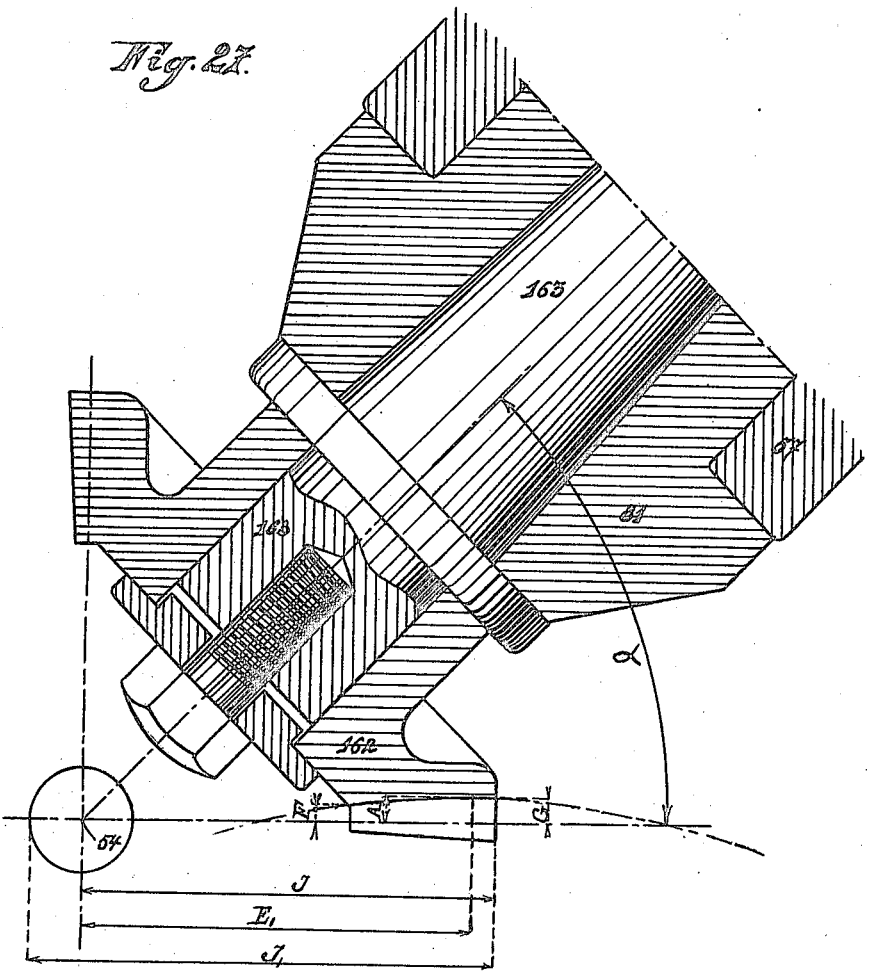
Figure 28:
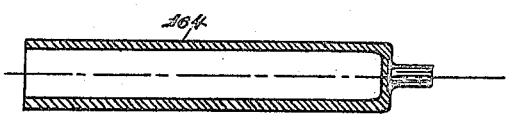

Fig. 6ª is a fragmentary section through the cross slide 15 and the slide 16;

Fig. 6ᵇ is a plan view of the parts shown in Fig. 6ª;

Fig. 7 is a detailed section of the cutter;

Fig. 8 is a longitudinal section along the axis of the machine;

Fig 9 is a section on the line 9—9 of Fig. 5;

Fig. 10 is a transverse section on the line 10—10 of Fig. 5;

Fig. 11 is a section on the line 11—11 of Fig. 5;

Fig. 12 is a transverse section on the line 12—12 of Fig. 5;

Fig. 13 is a side view showing the arrangement of the idler 101;

Fig. 14 is an elevational view on the line 14—14 of Fig. 5;

Fig. 15 is a section on the line 15—15 of Fig. 4;

Fig. 16 is a transverse section through the supporting rollers 152 for a rack;

Fig. 17 is a section on the line 17—17 of Fig. 3;

Fig. 18 is a transverse section of the work support;

Fig. 19 is a side view of the indexing means;

Fig. 20 is a section on the line 20—20 of Fig. 3;

Fig. 21 is a section along the line 21—21 of Fig. 20;

Fig. 22 discloses a detail for obtaining adjustment about one-half of the circular pitch;

Fig. 23 is a section through parts shown in Fig. 22;

Fig. 24 is a plan view of the parts shown in Fig. 22;

Fig. 25 discloses the means for adjusting the cutting tools;

Fig. 26 is a diagram showing the various positions occupied by the cutter during adjustment;

Fig. 27 discloses the arrangement of the work on the carrying spindle;

Fig. 28 discloses a sleeve employed in connection with the work support;

Figs. 29, 30, 31, 32, 32ª and 33 show diagrammatic views.

In order to make the machine better understood, the principle on which it is based will be first explained with reference to Fig. 1.

Let $a$ be the apex of the pitch cone of a bevel pinion, $b$ the pitch circle of the said cone, $c$ the pitch circle of a horizontal flat wheel intended to mesh with the pinion, B and C the respective axes of rotation of the pinion and of the wheel, and $d$ their common generatrix.

Further, let E be the surface of the tooth of the horizontal wheel shown by the circle $c$, which passes through the point $f$ where the circles $b$ and $c$ touch, and the line $g$ its intersection with the plane of the circle $c$. The corresponding surface $e$ of the pinion tooth will be the evolute of the surface E when the pinion is rolling on the wheel; if, therefore, the wheel and the pinion rotate so that their relative movement is a rolling one, each position of the surface E will be tangent to the surface $e$.

In order to simplify, let the surface E be a plane: the line $g$ becomes a straight line, and the intersection of this plane with a plane perpendicular to the contact generatrix $d$ at the point $f$, is the outline H of a tooth $i$ of the flat wheel. The evolute of E is then a surface $e$ which has for directrix on the pitch cone the evolute of $g$, that is to say, a conical helical line $k$.

In order to effect the cutting of a helical tooth, a milling cutter is used with tools secured to it, so arranged that its axis is perpendicular to the plane E, and so that the finishing edge of each tool passes through the said plane. In these conditions, all these edges describe the surface E during rotation of the milling cutter.

This milling cutter is adjusted so that its plane of cutting passes through the line $g$. The distance $am$ from the centre of the flat wheel to the line $g$ must, therefore, be equal to $af$ sine $\alpha$; the said angle $\alpha$ being that comprised between the lines $af$ and $g$. By taking the angle $\alpha = 30$ degrees, we have $am = \dfrac{af}{2}$. In practice, the distance of the milling cutter from the axis C is given by tables and finally, the tools are mounted so that they move parallel to themselves, which enables them to be brought to the desired level.

It will then only be necessary to turn the slide carrying the milling cutter, about the axis C, in order to cause it to follow the ideal movement of the wheel $c$, and to give the pinion to be cut a conjugated movement of rotation, in order that the milling cutter can cut the surface $e$ of the tooth of the said pinion in a continuous manner.

When the milling cutter has completed its travel on the pinion, a quick return brings all the mechanism back to its initial position. A dividing mechanism operated either by hand or automatically, turns the pinion to the extent of one pitch, and the milling cutter is thus able to cut a second surface identical with $e$.

After a complete revolution of the pinion to be cut, the milling cutter is rotated to the extent of half a revolution about the vertical axis of its slide, and the new plane of cutting of the tools is then symmetrical with the preceding one. This new plane is adjusted as before, the slide is thereupon rotated about the axis C to an angle with the centre corresponding to the circumferential half pitch to be obtained, the pinion remaining stationary. In this new position, the milling cutter is ready for cutting the second surface of each helical tooth of the pinion.

By arranging the milling cutter so that its plane of cutting passes through the point $a$, this is to say along the line $af$, a bevel pinion is cut with straight teeth, and it will be readily understood that, between the said limit and that of the line $g$, it would be possible to vary the position of the milling cutter to suit the pitch of the helical line which it is desired to obtain for cutting the teeth.

Finally, with the same tool can also be cut spiral or helical cylindrical pinions. The plane E then represents that of a face of a straight or oblique tooth of the toothed rack engaging with the pinion to be cut.

As a milling cutter of large diameter is used, a large number of tools may be arranged on it, and owing to the continuous advance of the said cutter during the work, a large production is obtained.

The tools being detachable and sliding, their height above the plane of the circle $c$ can be varied, which makes it possible to cut gear wheels of different kinds with the same tools. Finally, the tool is easily manufactured and can be easily replaced.

Referring to the several figures of the drawings, the machine comprises two groups of mechanisms which are separated but co-act, to-wit: the milling cutter supporting group or turret, and the work supporting group. These two groups are mounted on a platform 10. The turret comprises a circular plate 11 (Fig. 6) arranged on a platform or base 10, a rotary bottom carriage 12 centered on a toothed ring 13, which without play, can rotate on the circular plate 11. The carriage 12 may be adjusted about a small angle, with respect to the toothed ring 13. To this end, the ring 13 has a smooth portion 131 (Figs. 22, 23, 24) to receive bearings 132, in which is journaled a shaft 133, provided with a worm and terminating in a squared portion. The worm meshes with a toothed sector 134 disposed in a groove of the carriage 12. The slots 135 provided in the lower part of the carriage 12 permit rotation thereof after the screws 14 have been loosened. The extent of the displacement may be determined by means of a Vernier scale graduated to one-fiftieth and provided on the carriage 12 and by a graduation in millimeters of the annular groove of the toothed ring 13.

On the carriage 12 (Fig. 6) a cross slide 15 is movably arranged. A screw 136 fixed to the carriage 12 is provided with a nut 137 fixed to the cross slide 15. By a similar arrangement such as the spindle 51 on the slide 15, the transverse displacement of an upper slide 16 is obtained. The relative displacements of these two slides may be determined by means of Vernier scales, and graduations provided where convenient. The slide 15 has two grooves 165 into which extend bolts 166, whereby the slide is secured to the carriage 12. The same slide 15 has also two grooves 167 (Fig. 6ª) into which enter bolts 168, whereby the slide is secured to the slide 16. The latter (Fig. 6) has a circular groove 138, into which extend bolts in order to maintain the carriage 16 in engagement with the circular base 17, on which the cutting tool 18 is arranged. The base 17 occupies during operation and relative to the cross slide 15 one or the other of two diametrically opposite positions which are obtained by rotating about 90 degrees to the right or left of the position indicated in Fig. 6. These two positions are marked on the carriers 16 and 17. Drive is imparted to the cutting tool 18 in the following manner:

The main horizontal drive shaft 20 (Fig. 5) is rotated by a pulley 19 and is equipped at its other end with a bevel gear 21 which meshes with a similar gear 22, keyed on a shaft 23, carrying at its other end a pinion 24 (Fig. 6) in mesh with a gear 25. The latter is keyed on a vertical shaft 26 disposed in the center of the turret. This shaft 26 is equipped at its upper portion with a bevel pinion 27 meshing with a similar gear 28, keyed on a shaft 29, disposed within the carriage 12. At one of its extremities the shaft 29 has a spur gear 30 in mesh with a toothed wheel 31, keyed on a horizontal shaft 32 parallel to the shaft 29. This shaft 32 is provided with a long key seat 140, in order to be shiftable, with respect to the key of a bevel gear 33 in mesh with a pinion 34 to which is fixed a spur gear 35. The bevel gear 33 bears against a support 141 fixed on the slide 15, and the pinion 34 equipped with a spur gear 35 is journaled in a bearing 142, also fixed to the slide 15. The spur gear 35 meshes with the pinion 36 keyed on a shaft 37 provided with a long key seat 143 and arranged in the interior of the cross slide 15. A bevel gear 38 guided by the support 144 fixed to the carriage 16 is in constant mesh with another bevel gear 39 formed integral with a vertical shaft 40, disposed in the center of the circular housing formed by the carriages 16 and 17. The upper part of the shaft 40 has keyed thereto a bevel gear 41 meshing with a similar bevel gear 42 keyed on a horizontal shaft 43 arranged interiorly of the base 17. The shaft 43 is provided also with a spur gear 44 meshing with a gear 45 (Fig. 6) keyed on the shaft 46, provided with a worm. The worm meshes with a screw wheel 47 keyed on a spindle 48, carrying at one of its extremities a cutting tool 18.

The spindle 48 is inclined 20 degrees with respect to the horizontal plane, and carries the holder plate 18 which is equipped with tools 49 and 145 (Fig. 7). The largest possible number of tools is provided and the tools 49 cut the flank on one side of the teeth, whereas the tools 145 in alternate arrangement with respect to the tools 49 cut the opposite flank. They are, therefore, inclined in the two directions, with respect to the radius so that they can be set after having been advanced outwardly in their sockets and secured in such adjusted position by the screws 147. The cutting edges of the finishing blades 49 are in a plane parallel to the holder plate 18.

The work support comprises a frame 52 on which is secured a sector 53, through which extends a thick shaft 54 (Fig. 8). The latter terminates at one side of a flange 55, on which the base 56 of the work carriage is secured by being keyed thereto and screwed thereon. The base 56 is adjusted on the circular part of the sector 53 such that it can assume every position in the vertical plane. After the base has been placed in a predetermined position by rotation with the shaft 54, it is fixed on the sector 53 by bolts 148 which enter an annular groove 149. The different positions are determined by a graduation in degrees and fractions thereof engraved on the periphery of the sector 53 (Fig. 3). A Vernier scale arranged at a suitable place permits accurate determination of the position.

At the other end of the shaft 54 the hub of a guide 59 is secured by several wedges and holding pins, said guide being termed "the inclination tooth rack guide." A brace 60 (Fig. 5) terminates at its ends in runners in the form of quadrants and is securely bolted to the base 56 and to the guide 59. This brace constitutes one side of an indeformable quadrilateral, having as pivotal axis and at the same time as one side the shaft 54, the other three sides being the guide 59, the brace 60, and the base 56. In order to obtain movements of the whole quadrilateral, the square end 61 (Fig. 3) is turned by a wrench, which end forms the extremity of a spindle provided with a worm 62 meshing with a toothed half ring 63 bolted to another half ring 64, having an actuating arm 65. The complete ring resulting from this connection turns in a groove 66 (Fig. 5) provided in a thickened part of the hub of sector 53 and the arm 65 (Fig. 9) secured to the brace 60 causes the quadrilateral to turn. A balanced weight not shown suitably secured to the half ring 64 balances the system which we shall term "inclinable quadrilateral." In the base 56, a carriage 57 may slide without play and is secured by bolts 150 (Fig. 18) after it has been placed in the desired position.

The brace 60 (Figs. 5, 9, 10, 17) has box-like extension 60$^a$ projecting at right angles therefrom. The outer ends of these boxes are closed by bearing brackets 157 through which passes a shaft 67. This shaft has at one end a square shank 68 enabling it to be rotated by means of a wrench. Two bevel gears 69 and 70 keyed to the extremities of the shaft engage respectively similar gears 71 and 72, which are respectively keyed to the ends of two spindles 73 and 74, having opposite threads and engaging slide blocks 75 and 76 of which the one, 75, is integral with a casing 77, secured to the work holder slide 57 and the other, 76, receives a sleeve 78 secured to a slide block 79 which can slide in the extension of the guide 59. The two slide blocks 75 and 76 support the horizontal shaft 80 parallel to the brace 60 and controlling the rotation of the work supporting spindle 81. On the drive shaft 20 (Figs. 2, 11, 12 and 13) a toothed wheel 84 is mounted in mesh with a gear 85 keyed on a shaft 86 parallel to the shaft 20. The latter carries also a gear 87 adapted to transmit motion to a gear 88 by an interposed idler 89. The shaft 86 is journaled in bearings 90, provided on the platform 10 and the two gears 84 and 87 may loosely turn on the shaft 20, but each of said gears is provided with coupling jaws 91 and 92, respectively, with which alternately a sleeve 93 splined on shaft 20 may enter into engagement. This sleeve is shifted longitudinally by means of an ordinary shift lever 90'. When the sleeve 93 engages the jaws 92 the shaft 86 rotates in the same direction as the shaft 20; whereas, it turns in the opposite direction when the sleeve 93 enters into engagement with the jaws 91. At one of its ends the shaft 86 is provided with a bevel gear 94 in mesh with a bevel gear 95 whose shaft 165 carries a spur gear 96 in mesh with a similar gear 97 of the shaft 166, on which a clutch sleeve 98 is splined. The latter is shifted longitudinally by means of a suitable lever for the purpose of assuring a quick return, and after each return for a new working stroke of the cutter. It brings about the quick return when it is in engagement with the jaws 99 of a spur gear 100, meshing with a pinion 101, which latter meshes with a pinion 102 keyed on a shaft 103. This shaft is keyed to a toothed wheel 104 in mesh with a gear 105 provided with clutch jaws 106 with which may be placed in engagement the adjacent jaws of the sleeve 98 for the operating speed. The driven gears 102 and 104 are keyed to the spindle 103 of a worm 107 which they rotate in order to determine the rotation of a drum 108 (Fig. 8) provided for that purpose near one of its extremities with teeth 109 in engagement with said worm. At its other extremity the drum has spur teeth 110. The drum 108 is mounted on a cylindrical extension of the hub of sector 53 (Fig. 8) and has no contact with the shaft 54 of the movable quadrilateral; but by its spur teeth 110 which mesh with a rack 111 secured to the slide 112 it drives said slide which travels in the adjustable guide 59.

The adjustment of the rack 111 brings about the rotation of a toothed wheel 113 keyed on the shaft 80. The latter carries at its other extremity a bevel gear 82 (Fig. 17) in mesh with another bevel gear 83 keyed on the extension of a rotary frame 129. This frame incloses a worm 127 (Fig. 20) in mesh with a worm wheel 128 keyed on a carrying spindle 81. The carriage 112 (Figs. 14, 15, 16) with the rack 111 has a pin 114 adjusted with precision and engaging a slide block 115 which travels with precision on the horizontal part of a frame 116 in the form of a T. It follows therefrom that when the slide block 112 is not horizontal (and it never is) the pin 114 of the block 115 shifted by the slide block 112, imparts to the T frame 116 a movement from below to above and vice versa, according to the direction of movement, because this T frame can only rise or descend, in view of the fact that it is arranged to slide on a vertical guide 117 secured on the frame 52. The T frame 116 is equipped with a rack 167 which meshes with a toothed wheel 118 keyed on the same shaft 168 as the bevel gear 119 in mesh with a similar gear 120 keyed on a vertical shaft 121, at the lower end of which a toothed wheel 122 is keyed, imparting movement to the toothed ring 13 (Fig. 5) by means of a double horizontal rack 123 provided with teeth on its two sides. This rack rolls on four rollers 151 (Fig. 16) carried by two guides 152. To index, the worm 127 is operated (Figs. 19, 20 and 21) by means of a swinging frame 126 mounted on a trunnion 125 of the frame 129, and carrying a train of gears.

The worm 127 is locked by a spring-controlled finger 153 which engages a recess of a disk 154 keyed on the shaft 155 of the handle 156. The shaft 54 of the quadrilateral (Fig. 8) is provided with a conical bore 124 for a purpose presently to be described.

*Adjustment before the operation.—Adjustment of the cutter.—Adjustment of the distance "A."*

To this effect a mandril 167' is introduced into the conical bore 124 (Fig. 25) of the shaft 54 of the quadrilateral which is secured by actuating the squared end 158 of the spindle 159 which extends through the same. Thereupon a cap 160 is placed over the cylindrical part and which terminates in a tenon 161 having a profile cut under 20 degrees (B) with respect to the vertical plane. The vertical of the point O (the intersection of the axis of the quadrilateral with the profile B) is by this construction the center of rotation of the turret. In order to adjust the distance A over which must pass the cutters above the horizontal plane, a wedge C (Fig. 25) is employed generally obtained by the superposition of wedges of a thickness expressed in millimeters and fractions thereof which wedges are furnished with the machine. The thickness to be employed is given by a table in the various cases, the wedge C being placed as indicated in Fig. 25, the upper cutting edges of the tools 49 must touch this wedge, and the inclined cutting edges must touch the profile B. It is easy to establish this double contact either by inserting wedges 146 in front of or in back of the tool or by the sharpening of the cutter when the moved back tool prematurely engages the profile B. This permits to a certain extent the employment of the same cutters to cut the different forms.

The screws 147 (Fig. 7) hold the tools in a convenient position. The tools 145 (Fig. 7) are arranged to engage the wedge c. It is evident that the edge $B_1$ terminates behind the profile B. After this regulation the cutting tool occupies the position D (Fig. 26). This figure represents in plan view diagrammatically the different positions which the cutting tool occupies during its adjustment. The ellipses are the various positions of the original circle of the cutting tools arranged in a plane inclined 20 degrees to the vertical plane; i. e., the plane E.

A. Before the first adjustment is effected, the following is to be noted:

1. The carriage 12 (Fig. 6) is secured on the toothed wheel 13 by the screws 14. The zero points of the scale of the carriage 12 (Fig. 24) and the graduation of the toothed wheel 13 coincide.

2. The cross slide 15 (Fig. 6) is secured on the carriage 12 by the bolts 166. The zero points of the scale of the cross slide 15 and the graduations of the carriage 12 coincide.

3. The slide 16 is secured to the cross slide 15 by the bolts 168 (Fig. 6a). The zero points of the scale of the slide 16 and the graduations of the cross slide 15 coincide.

4. The carriage 17 (Fig. 6) is secured by bolts 139 to the slide 16 in one of two positions in which the vertical plane passing through the axis of the spindle 48 is perpendicular to the displacement of the slide 16 on the cross slide 15 (position shown in Fig. 5 and the diametrically opposite position). Finally, the shaft 40 (Fig. 6) is in alignment with the shaft 26 constituting the center of the turret when the diverse parts comprising the latter occupy the relative positions defined in the four preceding cases.

B. An adjustment of the distance H (Figs. 25 and 26). In the exposition of the principle it has been established that this distance is equal to the original generatrix to be cut, multiplied by the sine of the angle of inclination of the helice to be obtained. For an angle of 30 degrees the distance H is, therefore, equal to half of the generatrix. After having disengaged the bolts 166 (Fig. 6) the end of the screw 136 carried by the carriage 12 is manipulated, whereby a displacement of the cross slide 15 and, consequently, that of carriages 16 and 17 is obtained. The desired adjustment of H having been obtained, the bolts 166 are again tightened. The cutter occupies center position D (Fig. 26).

C. Adjustment of the distance E (Fig. 26). This distance is defined by the distances F and G (Fig. 27), the heights obtained in the engagements of the conical teeth with the spur teeth and having the teeth of the same length. It is to be considered that this length is smaller than the original generatrix of the cone at the large end of the tooth and larger than the generatrix at the smaller end. This exact length for the most cases is furnished by a table which contains the case of meshing by bevel teeth with screw teeth and with spur teeth. The manner of calculating this table is predicated on the assumption of an angle of inclination of the screw teeth at 30°, it being $x$, $y$ (Fig. 30) the original plane of the flat wheel, $u$, $v$, the plane of the cutter inclined at 20° and $s$, $t$, the axis of rotation of the cutter. Assuming a recess of the cutter about the point of intersection $a$ with the plane $x$, $y$, the exterior cutting edge of the tools describes the circumference $q$, $r$, having for its center $R_2$ situated at the intersection of the vertical $R_1$ and the perpendicular erected at the center of the chord $b, d$. It is, therefore, necessary to compute $R_1R_2 = R_1R_3 + R_3R_2 = E$ (Fig. 26).

A. Compute $R_1 R_3$ as follows: From the figure 30 follows:

$$R_1R_3 = ae = \frac{af + ac}{2}$$

but $af^2 = hf^2 - ah^2$. $hf$, which we designate by $G'$, is known because it is equal to $hc$ or $G$ (original generatrix) minus the length $cj$ of the utilized generatrix (length of teeth).

$ah$ is a portion H of the preceding regulation and equals $\frac{G}{2}$, by hypothesis. We can, therefore, express $$af^2 = G'^2 - \frac{G^2}{4} \text{ and } af = \frac{1}{2}\sqrt{4G'^2 - G^2}.$$

On the other hand, $$ac^2 = hc^2 - ah^2 = G^2 - \frac{G^2}{4} \text{ and } ac = \frac{G\sqrt{3}}{2},$$

introducing these values in the equation 1, the following is obtained:

$$R_1R_3 = \frac{\frac{1}{2}\sqrt{4G'^2 - G^2} + \frac{1}{2}G\sqrt{3}}{2} = \frac{1}{4}(\sqrt{4G'^2 - G^2} + G\sqrt{3})$$

B. Computation of $R_3 R_2$ from the figure follows:

$$R_3R_2 = R_3k \times tg\epsilon = (R_3e - ek)tg\epsilon.$$

But $$R_3e = R_1a = Ra = \frac{ao}{\cos 20°}$$

which is a constant equal to 190$^{mm}$.

$$ek = \frac{bf + cd}{2};$$

$cd$ is the coefficient M at the large end of the tooth and $bf$ is the coefficient $m$ at the small end equal to $$\frac{M \times G'}{G}$$

Then $$ek = \frac{M + m}{2}$$

$$\frac{1}{4}(\sqrt{4G'^2 - G^2} + G\sqrt{3}) + \left(190 + \frac{M + m}{2}\right) \times \frac{2(M - m)}{G\sqrt{3} - \sqrt{4G'^2 - G^2}}$$

which expression may be simplified to $$\frac{G^2 - G'^2 + M^2 - m^2 + 380(M - m)}{G\sqrt{3} - \sqrt{4G'^2 - G^2}}$$

For a conical engagement with spur teeth $$R_1R_3 = \frac{G + G'}{2} \text{ and } R_3R_2 = \left(190 + \frac{M + m}{2}\right) \times \frac{M - m}{G - G'}$$

$$fc = G - G' \text{ and } tg\epsilon = \frac{M - m}{G - G'}$$

Then follows $$R_1R_2 = \frac{G + G'}{2} + \left(190 + \frac{M + m}{2}\right) \times \frac{M - m}{G - G'}$$

which expression may be reduced to $$\frac{G^2 - G'^2 + M^2 - m^2 + 380(M - m)}{2(G - G')}$$

which is the distance E of Fig. 27.

We shall now consider the computation

We have now $R_3 R_2$, and only $tg$ is to be determined.
But $$tg\epsilon = \frac{dp}{pq} = \frac{M - m}{cf}$$

But $$cf = ac - cf = \frac{G\sqrt{3}}{2} - \frac{1}{2}\sqrt{4G'^2 - G^2}$$

from which follows that $$tg\epsilon = \frac{2(M - m)}{G\sqrt{3} - \sqrt{4G'^2 - G^2}}$$

Finally $$R_3R_2 = \left(190 + \frac{M + m}{2}\right) \times \frac{2(M - m)}{G\sqrt{3} - \sqrt{4G'^2 - G^2}}$$

Figure 31:
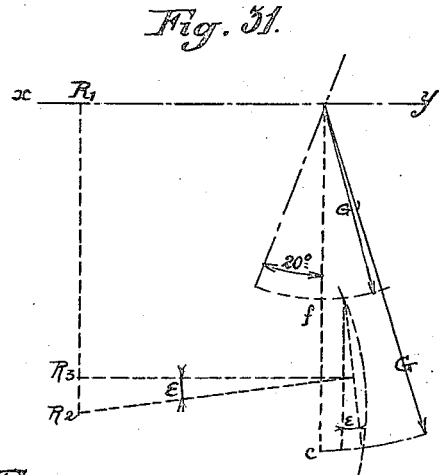

The total displacement $R_1 R_3 + R_3 R_2$ is thus equal to the preceding displacement H is suppressed and Fig. 31 is obtained by development of the cutter plane on the plane $xy$. We obtain:

$$R_1R_2 = R_1R_3 + R_3R_2$$

of height A Fig. 25. Fig. 32 is again a development of the plane of the cutter on the plane $xy$. We first compute the distance $\lambda$.

The chord $dn = 2R_2N = 2(R_3N - R_2R_3) = cf - R_2R_3$ $cf$ and $R_2 R_3$ have been determined previously.

Figure 32:
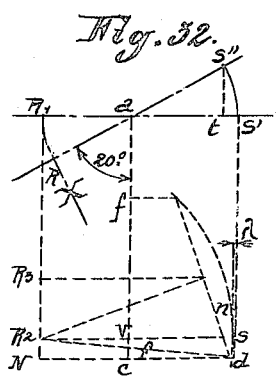
Figure 32A:
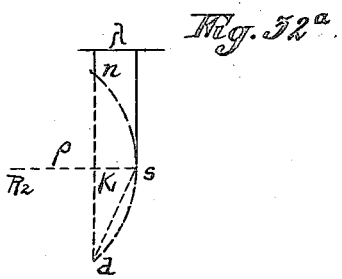

S P is the outer radius of the cutter (Fig. 32$^a$.) $k$ is the center of the horizontal chord $dn$, and $sd$ differs hardly from $dk$. But $sd^2 = 2P \times sk_1 = 2P.\lambda$.

Choosing $sd = dk_1$, we obtain by approximation $$dk_1^2 \text{ or } \frac{dk^2}{4} = 2P.\lambda.$$

$\lambda$ is given if P were known.
But according to Fig. 32

$$P = dR_2 = \sqrt{R_2N^2 - Nd^2} = \sqrt{R_2N^2 + (Nc + cd)^2}$$

$$ReN = \frac{cf}{2} - R_3R_2$$

which are known quantities
$NC = R_1a = Ra = 190$ m/m
$cd = M$, the cutting coefficient
Thus $\lambda$ is determined
The height A is equal to $s''t$
But $$s''t = s'' \ a^x \cos 20°$$
$$s''a = s'a = Sv = M + \lambda.$$

Consequently $$s''t = (M + \lambda) \cos 20°.$$

The adjustment E is obtained from the table so that after having loosened the bolts 168 (Fig. 6a) the squared portion 51 of screw carried by slide 15 (Fig. 2) is turned. This screw turns in a nut integral with the carriage 16 which is thus shifted. After the desired adjustment the bolts 168 are tightened.

The cutter occupies then definitely the position $D_2$ (Fig. 26) and it is obvious that by rotation about the center O of the turret it is inclined under an angle B (position $D_3$ corresponding to the angle of inclination of the screw) when it will pass in the vertical plane determined by OX and which coincides with the spindle.

Specific example: A conical, helical pinion of the following dimensions is to be cut:
Coefficient 5, 24 teeth, original diameter 120 mm.
Length of teeth computed from the original generatrix 30 mm.
Original generatrix 84.85. Inclination of helice 30°. Due to computation we obtain distance $\lambda = 1.01$ mm.
$A = (5 + 1.01) \cos 20° = 5.65$ Considering a constant of construction $A + C = 12$ mm (Fig. 25), we find that the thickness of the wedge to be employed for the first adjustment is $12 - 5.65 = 6.05$ mm.

For the second adjustment we find $$H = \frac{84.85}{2} = 42.425 \text{ mm}.$$

Finally for the third regulation $$E = R_1R_2 = 63 \text{ mm}.$$

For a conical pinion with spur teeth having the same characteristics we obtain $$E_1 \text{ (Fig. 27.)} = 81 \text{ mm}.$$

We also know that the regulation H does not exist.

Regulation of the work.

The work 162 (Fig. 27) is mounted on a mandrel 163 secured in the spindle 81 by a transverse bolt.

*Angular adjustment.*—As has been previously explained, the squared portion 61 (Fig. 3) is turned to obtain rotation of the quadrilateral about the horizontal shaft 54. The lower generatrix of the original cone to be cut before being horizontal the angle α (Fig. 27) will be equal one-half the angle of the top of the original cone. The displacement of the quadrilateral may be viewed on the sector 53 (Fig. 3) having graduations in degrees. Thereafter, the bolts 148 (Fig. 8) are tightened and the quadrilateral is locked.

Adjustment of the distance J. (Fig. 27).

The sleeve 160 (Fig. 25) is replaced by the sleeve 164 (Fig. 28) terminating in a cylindrical stem having a diameter of 20 mm.

The squared portion 68 (Fig. 5) of shaft 67 is turned whereby shaft 80 is parallelly displaced, by reason of screws 73 and 74 actuating slides 75 and 76 and consequently the carriage 57 integral with frame 77 which is secured to slide 75. This shifting is terminated when the distance $J_1 = J + 10$ (Fig. 27) easily measured at the foot of the slide.

The bolts 150 (Fig. 18) are tightened to secure the carriage 57. The sleeve 164 is removed, the mandrel 157 extracted and the bolt 159 is turned. The adjustment is then completed. It may be rapidly carried out after a little practice.

Operation.

The cutter is continuously rotated by the main drive shaft 20 (Fig. 5) and the intermediary shafts 23, 26, 29 (Fig. 6). The pinion 30 meshing with the gear wheel 31 determines the rotation of the shaft 32, which carries the bevel gear 33 in mesh with the similar gear 34 secured to the spur gear 35. These three gear sets are secured to the cross slide 15 and move therewith in its adjusting movement. The spur gear 35 meshes with the toothed wheel 36 keyed to the shaft 37 and determines the rotation of the bevel gear 38 which follows the movements of the carriage 16 in its adjustment. The bevel gear 38 transmits rotary movement to the vertical shaft 40 and through the gearing 41, 42, 44 and 45 to the worm 46 and the screw wheel 47. The latter drives the shaft 48 which carries the cutter 18. The movement of the cutter independent of its rotary movement and about the axis of the turret will be explained hereinafter. The rotation of the work to be cut is obtained in the following manner:

Before the machine is placed in operation, the coupling sleeve 93 (Fig. 11) is placed in engagement with the jaws 91 or 92 of the toothed wheels 84 or 87, depending on whether left or right helical teeth are to be cut. It is to be noted that the sleeve remains in engagement throughout the operation of the machine. The shaft 86 transmits motion to the shaft 165 (Fig. 12) by the meshing bevel gears 94 and 95. The toothed wheels 96 and 97 which are in engagement drive the shaft 166. The sliding sleeve 98 provided on the shaft 166 is placed in engagement with the jaws 106 of the spur wheel 105, which meshes with the gear 104 keyed on the shaft 103. The latter rotates with reduced velocity throughout the period of operation. The worm 107 meshing with the worm wheel 109 determines the rotation of the drum 108 (Fig. 8). The gear 110 of the drum causes a longitudinal shifting of the rack 111 (inclined about the angle with respect to the horizontal) secured to the slide 112 which moves in the guide 59. The rack 111 effects rotation of the spur gear 113 (Figs. 5 and 10) keyed on the shaft 80 parallel to the horizontal axis of the machine. This shaft 80 (Figs. 5 and 17) carries the bevel gear 82 in mesh with the bevel gear 83 secured to the frame 129 and causing rotation of the worm 127 (Fig. 20) which drives the worm wheel 128 keyed to the spindle 81 which carries the blank.

During the same time the slide 112 secured to the rack 111 (Figs. 14 and 15) shifts the slide 115 which imparts to the T frame 116 a vertical movement caused by the guide 117. Due to this movement, the vertical rack 167 of the T frame 116 causes the toothed wheel 118 to turn which is keyed to the horizontal shaft 186 having a bevel gear 119 whereby the vertical shaft 121 is rotated. The latter, by means of the spur wheel 122, and the rack 123 (Figs. 5 and 15) causes rotation of the toothed ring 13 and thereby rotation of the cutter about the center of the turret. The plane of operation of the cutter varies, therefore, in proportion to the formation of the screw teeth on the pinion to be cut.

When the cutter is not any more in contact with the pinion to be cut, the sleeve 98 (Fig. 12) is coupled to the toothed wheel 100 which meshes with the pinion 102 through the idler gear 101 (Fig. 13). The shaft 103 rotates then with accelerated speed during the return movement which is stopped as soon as the cutter occupies its original position. This is accomplished by actuating the handle 156 (Fig. 20). Thereafter the sleeve 98 (Fig. 12) is placed in engagement with the jaws 106 and the same cycle of operations is completed until all of the left sides, for instance, of the teeth have been cut.

Figure 29:
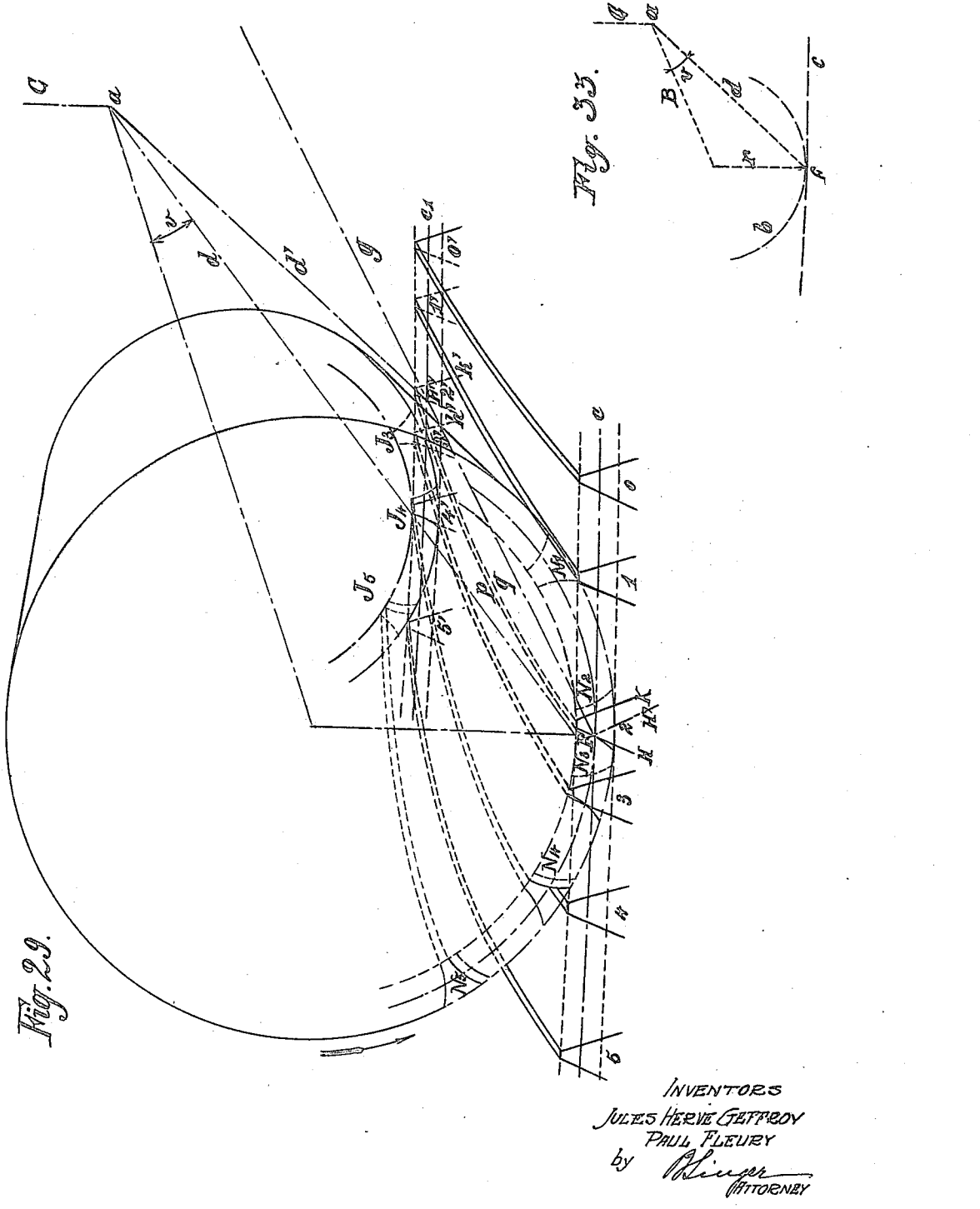
Figure 30:
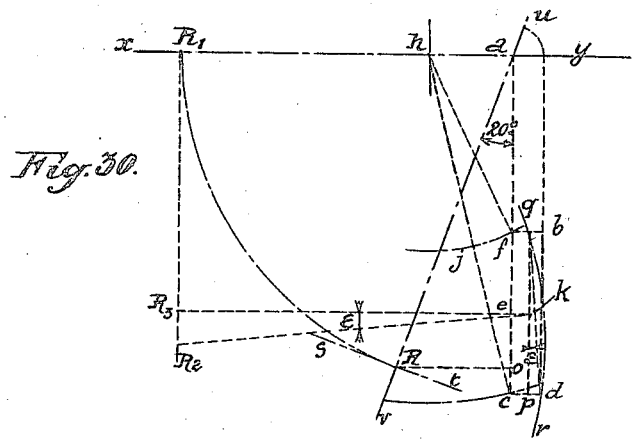

In order to cut the right flanks, the bolts 139 (Fig. 6) are loosened, whereupon a half rotation is imparted to the carriage 17 which is then secured in the new position. The new plane of operation of the cutter is then symmetrical to the preceding one. Thereupon the lower slide 12 is rotated half the distance of two teeth (Fig. 24) with respect to the toothed ring 13. In order to obtain this adjustment the screws 14 are loosened and the squared end 169 of the worm 133, which is in engagement with the toothed sector 134, fixed to the slide 12 is turned. The work, as is obvious, remains stationary. The adjustment of the toothed ring 13 which may be determined from the graduation in millimeters is given by the formula $\frac{1}{2}$ circular pitch $\times R/G$, where R is the inner radius of the toothed ring 13 and G the generatrix of the pinion to be cut. After this adjustment has been obtained the screws 14 are tightened. The machine is then ready to form the right flanks. In order to indicate the different phases of operation of the cutter, in Fig. 29 is shown in perspective a certain number of positions corresponding to the helical teeth to be cut. In order to render the figure clear, the cutting edges of the tools are omitted and merely the surfaces have been indicated which are described by these edges, only such portions of the surfaces being shown, however, which are in engagement with the teeth which are to be cut. The lines $c$, H, $g$, C, $d$ and the point $f$ have the same meaning as in Fig. 1, which illustrates the principle of the machine. The original surface of the plane imaginary wheel is defined by the circles $c$ and $c'$. In other words, if the pitch cone of the cone to be cut is rolled on the plane which is tangential thereto following the generatrix $d$, the faces of this cone would roll on $c$ and $c'$. The lines H and $g$ determine the plane E (already defined in Fig. 1). The line H and K represent the sections of the surfaces which are described by the cutting edges of the tools by the vertical plane at the line $c$ at the point $f$. They form the two sides of a tooth of an imaginary circular rack which has for its generatrix the circle $c$. The lines $h'$ and $k'$ are sections of the same surfaces formed by the vertical plane perpendicular to $c'$ at the point F'.

They form the two sides of a tooth of an imaginary circular rack which would have as generatrix the circle $c'$.

The surface which contains H and an $h'$ is the plane E; it is perpendicular to the axis of the cutter and this plane is described by the finishing edges during the rotation of the cutter.

The surface containing K and $k'$ is the cone described by the preliminary cutting edges of each tool during the rotation of the cutter. The arcs of circle $p$ and $q$ are described by the extremities of the upper cutting edge of each tool. The width of this edge is somewhat smaller at the bottom of the tool to be cut, this bottom being at the small base of the pinion.

To sum up, the figure formed by H, K, $h'$, $k'$, $p$, $q$ represents a portion of the tooth of the imaginary plane wheel which could mesh with the given pinion and the axis of rotation of this plane imaginary wheel is a vertical C. When the tooth occupies the position $o$ $o'$ it is outside of the pinion to be cut. It be assumed then that the cutter is turned about itself, while the carriage is rotated about the vertical C. It be also assumed that the pinion to be cut turns about itself in such manner that its rotation is conjugated with that of the turret; i. e., that the relative movement of the pitch cone of the pinion, with respect to the plane of the imaginary circle $c$ should be a rolling movement.

If $w$ is the angular velocity of the pinion, then the velocity of the point $f$ on $b$ (Fig. 33) will be $r \times w$, $r$ being the radius of the circle $b$.

If $w'$ is the angular velocity of the imaginary wheel $c$, the velocity of the point $f$ on $c$ will be $af \times w'$. Consequently $af \times w' = r \times w$. From this follows that $$w' = \frac{w \times r}{af} = w \times \sin \alpha$$

being the half angle of the original cone of the pinion to be cut.

We shall see hereinafter how this condition is met in the machine. Reverting to Fig. 29, when the tooth comes into the position 1, 1' it will be tangential to the pinion and it will begin to cut the helical tooth N' which represents the tooth to be obtained at the large end of the pinion. At the position 2, 2' of the tooth the position $N^2$ corresponds and the left face of $N^2$ is actually cut as well as a part of the lower part of the helical tooth.

In the positions 3, 3', the left profile of $N^3$ is completely cut and the tooth $J^3$ at the small end of the pinion is partly cut, while the left face of $J^3$ is being formed. In the positions 4, 4', $N^4$, $J^4$, the lower part of the helical tooth is terminated (to an extent equal to the length of the tool) and the face of the left side of $J^4$ is profiled. In the positions 5, 5', $N^5$, $J^5$, the left flank of the helical tooth is terminated, and the tooth 5, 5' i. e., the cutter, is not any more in contact with the pinion. At this moment it is necessary to quickly return the cutter and the pinion into their original positions. The tooth 5, 5' returns to the position $o$, $o'$ and the tooth N comes into the position N. The adjustment mechanism causes the pinion to turn a distance equal to the circular pitch and thereupon the left flank of the second helical tooth is cut. When the pinion has completed a revolution the cutting of the right flank is begun. To this end, the cutter is rotated about 180° as previously explained. The new position of the plane described by the finishing edges will be symmetrical to the previous one. For instance, the finishing edge H will be H'. It is, therefore, sufficient to turn the pinion half a circular pitch, the blank support remaining stationary in order to bring the right flank $N^2$ into contact with H'; i. e., in order to be able to cut this flank. Instead of turning the pinion, the carriage of the cutter may be turned half the circular pitch and then the pinion remains stationary. As is obvious, the machine utilizes both of these methods.

If the spindle 81 (Fig. 5) is rotated about an arbitrary angle $u$, it is necessary that the cutter support and the toothed ring 13 turn about an angle U' which equals $u \times \sin \alpha$. In constructing the machine, the toothed wheels 110, 113 and 118 are equal. The bevel gears 82 and 83 have a ratio of $d/D$ equal to that existing between the toothed wheel 122 and the toothed ring 13. We have seen that the displacement of the rack 111 determines the rotation of the wheel 113 keyed to the shaft 80 which, by the bevel gears 82 and 83, entail rotation of the spindle 81 carrying the work. If, therefore, the drum 108 together with its gearing 110 rotates about an angle $u'$ the wheel 113 and the pinion 82 also turn about the angle $u'$. The gearing 82 and 83 being in the ratio of $d/D$, the gear 83, and, consequently, the spindle will turn about an angle $u' \times d/D = U$ (assumption). On the other hand, the toothed ring 13 which causes rotation of the work support receives its movement from the toothed wheel 122 (Figs. 14 and 15) by means of the horizontal rack 123, but the wheel 122 is keyed to the shaft 121 which carries the bevel gear 120 in mesh with the bevel gear 119, which is keyed to the shaft 168, which carries the wheel 118. If, therefore, this wheel 118 turns about an angle $u^2$, the same applies to the wheels 119, 120 and 122. The ratio of the diameters of wheels 122 and 13 being equal to $d/D$, the ring 13 will then be rotated about an angle $u \times d/D = U'$ (by assumption). From this it follows that:

$$u' = u' \times \sin \text{ or } U^2 \times d/D = U^1 \times d/D \times \sin. \text{ or } U^2 = u^1 \times \sin \alpha.$$

The latter condition is realized by the device shown in Fig. 14. The wheel 118 meshes with the rack 167 of the T generator 116. The latter can only slide vertically in the guides 117 fixed to the frame 52 under the influence of the slide 115 traveling in the horizontal branch thereof. But this slide 115 is actuated by the carriage 112 which is equipped with a rack 111. Under these conditions it is evident that the path traversed vertically by the T frame 116 is equal to the path covered obliquely by the slide 112 multiplied by the sine of the angle of inclination of this slide, with respect to the horizontal plane. In other words, by the sine of the angle which is given on the graduation of the sector 53 (Fig. 3), we know that this angle is equal to one-half of the angle in the lower end of the original cone of the pinion to be cut. Finally, the rotations of the pinion to be cut and of the work support are conjugated and the evolute of the plane described by the finishing edges of the tools will represent one of the faces of the helical tooth of the pinion to be cut. Finally, it should be mentioned that the gearing 96 and 97 (Fig. 12) may be changed arbitrarily in order to vary the velocity of the generation of the helice for a like velocity of rotation of the cutter.

We claim:

1. In a machine of the character described, a rotary tool, means for adjusting the position of the tool, means for transmitting rotation to the tool independent of its position, a work holder, adjusting means for the work holder, means for imparting rotary drive to the work holder independently of the adjustment of its position, and means for imparting rotary movement to said tool about an extraneous axis, said means including a movable rack bar actuated by said work holder driving means, a second rack bar actuated by said first named rack bar, and a third rack bar geared to said second rack bar and causing said tool to rotate.

2. In a machine of the character described, a rotary tool, means for adjusting the position of the tool, means for transmitting rotation to the tool independent of its position, a work holder, adjusting means for the work holder, means for imparting rotary drive to the work holder independently of the adjustment of its position, and means for imparting rotary movement to said tool about an extraneous axis, said means including a movable rack bar, a runner secured to said rack bar, a vertical rack bar adapted to be shifted by said runner, and means for converting the vertical rack bar movement into a rotary movement of said tool.

3. In a machine of the character described, a rotary tool, means for adjusting the position of the tool, means for transmitting rotation to the tool independent of its position, a work holder, adjusting means for the work holder, means for imparting rotary drive to the work holder independently of the adjustment of its position, a horizontal movable rack geared to said driving means for the work holder, a runner secured to said rack, a T-frame having a vertical rack pivoted to said runner, a guide on which said frame is capable of vertical reciprocation, a vertical shaft geared to said frame rack, and a horizontal rack bar geared to said shaft and adapted to cause said tool to rotate about an extraneous axis.

4. In a machine of the character described, a rotary tool, means for adjusting the position of the tool, means for transmitting rotation to the tool independent of its position, a supporting shaft, a quadrilateral frame oscillatorily mounted on said shaft, a guide on said frame, a work holder slidably supported in said frame guide, a toothed ring rotatable on said shaft, an arm interconnecting said ring and frame, a spindle meshing with said ring, a drive shaft, and a transmission between said drive shaft and work holder including a rack, a driven shaft geared to said rack, and gearing interposed between said driven shaft and work holder.

In testimony whereof we affix our signatures.

JULES HERVÉ GEFFROY.
PAUL FLEURY.